US012730076B2

(12) United States Patent
Abeles

(10) Patent No.: US 12,730,076 B2
(45) Date of Patent: Sep. 8, 2026

(54) SURFACE INSPECTION SYSTEM AND METHOD

(71) Applicant: Ninox 360 LLC, Redwood City, CA (US)

(72) Inventor: Peter Abeles, Redwood City, CA (US)

(73) Assignee: Ninox 360 LLC, Redwood City, CA (US)

( * ) Notice: Subject to any disclaimer, the term of this patent is extended or adjusted under 35 U.S.C. 154(b) by 165 days.

(21) Appl. No.: 18/438,930

(22) Filed: Feb. 12, 2024

(65) Prior Publication Data

US 2024/0272086 A1 Aug. 15, 2024

Related U.S. Application Data

(60) Provisional application No. 63/515,693, filed on Jul. 26, 2023, provisional application No. 63/456,108, (Continued)

(51) Int. Cl.
*G01N 21/88* (2006.01)
*G06F 3/04842* (2022.01)
(Continued)

(52) U.S. Cl.
CPC ..... *G01N 21/8851* (2013.01); *G06F 3/04842* (2013.01); *G06T 7/0006* (2013.01); (Continued)

(58) Field of Classification Search
CPC ........ G01N 21/8851; G01N 2021/8887; G06F 3/04842; G06F 3/0484; G06F 3/04845; (Continued)

(56) References Cited

U.S. PATENT DOCUMENTS 4,317,632 A 3/1982 Orphan et al.
7,483,152 B2 1/2009 Jovancicevic et al.
(Continued)

FOREIGN PATENT DOCUMENTS

CA 2114259 C 4/2006
CA 2686904 C 4/2012
(Continued)

OTHER PUBLICATIONS

[Video] "Mentor Visual iQ 3D Phase Measurement Training," uploaded by Advanced Inspection Technologies, Apr. 4, 2019, https://www.youtube.com/watch?v=yRHEI-I_HIY.
(Continued)

*Primary Examiner* — William A Beutel
(74) *Attorney, Agent, or Firm* — Bodman PLC

(57) ABSTRACT

A surface inspection system and method includes a mobile computing device having a processor, an optical assembly, a memory device, and interfaces in communication with the processor, the memory storing instructions that when executed cause the system to perform the operations of generating a series of images representing a surface, receiving a selection of a region of interest in the series of images, generating a virtual high-resolution 3D reconstruction of the region of interest, and determining measurement information within the region of interest.

15 Claims, 11 Drawing Sheets

Related U.S. Application Data filed on Mar. 31, 2023, provisional application No. 63/444,964, filed on Feb. 12, 2023.

(51) Int. Cl.

*G06T 7/00* (2017.01)
*G06T 7/11* (2017.01)
*G06T 7/62* (2017.01)
*G06T 19/20* (2011.01)

(52) U.S. Cl.

CPC .................. *G06T 7/11* (2017.01); *G06T 7/62* (2017.01); *G06T 19/20* (2013.01); *G01N 2021/8887* (2013.01); *G06T 2200/24* (2013.01); *G06T 2207/20016* (2013.01); *G06T 2207/20104* (2013.01); *G06T 2210/36* (2013.01); *G06T 2219/2012* (2013.01)

(58) Field of Classification Search

CPC . G06F 3/04847; G06F 3/0488; G06T 7/0006; G06T 7/11; G06T 7/62; G06T 19/20; G06T 2200/24; G06T 2207/20016; G06T 2207/20104; G06T 2210/36; G06T 2219/2012; G06T 7/579

See application file for complete search history.

(56) References Cited

U.S. PATENT DOCUMENTS 7,821,649 B2 10/2010 Bendall et al.
8,082,120 B2 12/2011 St-pierre et al.
8,107,083 B2 1/2012 Bendall et al.
8,970,823 B2 3/2015 Heidemann et al.
9,325,974 B2 4/2016 Hébert et al.
9,495,764 B1 11/2016 Boardman et al.
9,633,426 B2 4/2017 Bendall et al.
9,733,181 B2 8/2017 Mann et al.
9,970,745 B2 5/2018 Natori et al.
10,186,049 B1 1/2019 Boardman et al.
10,217,207 B2 2/2019 Marra et al.
10,495,564 B2 12/2019 Maresca et al.
10,545,014 B2 1/2020 Ihlenfeldt et al.
10,591,288 B2 3/2020 Farniok et al.
10,671,255 B2 6/2020 De Swarte et al.
10,937,144 B2 3/2021 Starr et al.
11,024,079 B1 * 6/2021 Chuah .................... G06T 7/246
11,144,814 B2 10/2021 Cha et al.
11,262,194 B2 3/2022 Tohme et al.
11,418,761 B2 8/2022 Olsson et al.
2001/0015804 A1 8/2001 Doyle
2006/0007345 A1 * 1/2006 Olson .................. G02B 21/245 348/345
2014/0160115 A1 * 6/2014 Keitler .................... G06T 7/248 345/419
2016/0147408 A1 * 5/2016 Bevis ................... G02B 27/017 715/850
2016/0150219 A1 * 5/2016 Gordon ................ H04N 13/254 348/46
2016/0223470 A1 * 8/2016 O'Dell .............. H01L 21/67271
2017/0084015 A1 3/2017 Rhoades
2017/0294008 A1 10/2017 Torres et al.
2020/0064469 A1 * 2/2020 Trahey ................... G06N 5/046
2021/0183080 A1 * 6/2021 Hoiem .................... G06T 19/20
2022/0327731 A1 10/2022 Alalouni et al.
2024/0144429 A1 * 5/2024 Yang ...................... G06T 7/215

FOREIGN PATENT DOCUMENTS

CN 102095677 B 7/2012
CN 109990701 B 7/2020
EP 2230482 B1 10/2013
EP 3486870 B1 2/2021
ES 2599962 B1 11/2017
KR 20180125748 A 11/2018

OTHER PUBLICATIONS

[Video] "Ninox 360 Company Summary Spring 2022," uploaded by Ninox 360 LLC, May 9, 2022, https://www.youtube.com/watch?v=ZkdwuVVYhWU.

[Video] "Preview: Mobile Inspection by Ninox 360," uploaded by Ninox 360 LLC, Jul. 6, 2022, https://www.youtube.com/watch?v=bsn447MhOv0.

"3D Scanners, Professional 3D Scanners, Software and Support, EinScan", SHINING 3d, accessed May 13, 2024, https://www.einscan.com/, 2 pages.

"Mentor Visual IQ Video Probe", Berg Engineering & Sales Company, Inc., Jan. 2018, https://drive.google.com/file/d/113CoVmH_jogO0Uc_zF2xrm9ymHffw_el/view , 7 pages.

"Orthophoto-DSM", ContextCapture User Guide, Apr. 9, 2021, https://docs.bentley.com/LiveContent/web/ContextCapture%20Help-v18/en/GUID-1D6739CD-B03D-4AFE-B6FA-6AF73D5476E1.html, 12 pages.

"Professional 3D Scanners, Artec 3D, Best Industrial Laser 3D Scanning Solutions", Artec 3D Scanning Solutions, https://www.artec3d.com/, captured Feb. 4, 2023, at https://web.archive.org/web/20230204002426/https://www.artec3d.com/, 14 pages.

"ZADD Segmentation AI-based defect inspection for computed tomography", ZEISS, https://www.zeiss.com/metrology/products/software/zadd.html#defects, captured Jan. 27, 2023, at https://web.archive.org/web/20230127113131/https://www.zeiss.com/metrology/products/software/zadd.html#defects, 18 pages.

"Zeiss T-Scan hawk 2: The tool to get about anything done", ZEISS Industrial Quality Solutions, Feb. 1, 2023, https://www.zeiss.com/metrology/about-us/press/2023/t-scan-hawk-2.html, 7 pages.

[Video] "Assessing crack depth using drone-acquired orthophotos and DSMs: A viable approach for civil engineers and surveyors?", Ted Strazimiri, LinkedIn_ #photogrammetry #infrastructure, May 2023, https://www.linkedin.com/posts/tedstrazimiri_photogrammetry-infrastructure-activity-7048734987210129408-odtk?utm_source=share&utm_medium=member_desktop, 14 pages.

Creaform, Blog the Power of 3D Scanning for Corrosion and Mechanical Damage Assessment, Jan. 28, 2022, available at https://www.creaform3d.com/en/resources/blog/the-power-of-3d-scanning-for-corrosion-and-mechanical-damage-assessment, last acessed Apr. 1, 2026, 7 pages.

* cited by examiner

FIG. 5

SURFACE INSPECTION SYSTEM AND METHOD

CROSS-REFERENCE TO RELATED APPLICATIONS

The present application relates to and claims priority from the provisional patent applications No. 63/515,693, filed Jul. 26, 2023; No. 63/456,108, filed Mar. 31, 2023; and No. 63/444,964, filed Feb. 12, 2023, the entireties of which are incorporated herein by reference.

TECHNICAL FIELD

The present disclosure relates generally to non-destructive testing and more specifically to a hand-held mobile metrology system for image-based surface measurement and profile analysis.

BACKGROUND

Infrastructure and machinery materials are susceptible of degradation over time due to wear, corrosion or other factors. Options for evaluating a degree of degradation are limited, making it a challenge to determine whether the material has been compromised to a degree that negatively impacts functionality or safety. Common tools for material evaluation include a pit gauge or depth gauge that measures an amount of local surface area deformation. However, available tools have significant challenges in repeatability, accuracy, precision, traceability and usability. As a result, a complex surface profile may be reduced to a single number or a tedious and error-prone grid of measurements. Even slight changes in tool position or user skill can drastically change the measured values. Repeated measurements to track wear or corrosion overtime is another challenge in the use of manual tools.

More recently developed handheld metrology tools may involve the creation of highly-accurate three-dimensional (3D) surface scans that provide higher resolution and higher precision measurements, but require large or immovable equipment that cannot fit into tight spaces. In a traditional photogrammetry operation, imaging a scene generates large quantities of image data that requires data processing resources that are off-site or remote from the surface of interest, which requires additional time, and communication technologies. This burdensome data processing operation to transform the image data into 3D model data includes features and background that is not of interest to a targeted inspection. Therefore, an improved solution that provides portability and tight area access along with high resolution, accurate and repeatable measurements of a focused area of interest is needed.

BRIEF DESCRIPTION OF THE DRAWINGS

FIG. 5 is an exemplary graphical user interface displayed by the surface inspection system of FIG. 1 during the process illustrated in FIG. 2 in a failure mode.

Like reference numerals indicate like parts throughout the drawings.

DETAILED DESCRIPTION

The surface inspection system 10 and method 100 of the present disclosure concerns a device with an optical sensor, such as a camera, LIDAR or both, and with a display device that provides live feedback to an operator during use. The system 10 is configured to automatically detect and quantify surface defects through a method of creating sparse and dense 3D surface models based on two-dimensional images. The system provides tools to understand the surface topology of a target region of the surface being inspected based on local processing. The system may be implemented on a handheld, mobile device, such as a tablet computer, smartphone or equivalent computing device, and include wired or wireless connectivity to transmit or communicate surface inspection results to remote data storage or data consumers. The system may be implemented in combination with localizing technology that associates the target region of the inspected surface with real-world location, global location, or other relative location. The system may be applied for erosion or corrosion detection and analysis on infrastructure, machinery or the like.

Figure 1:
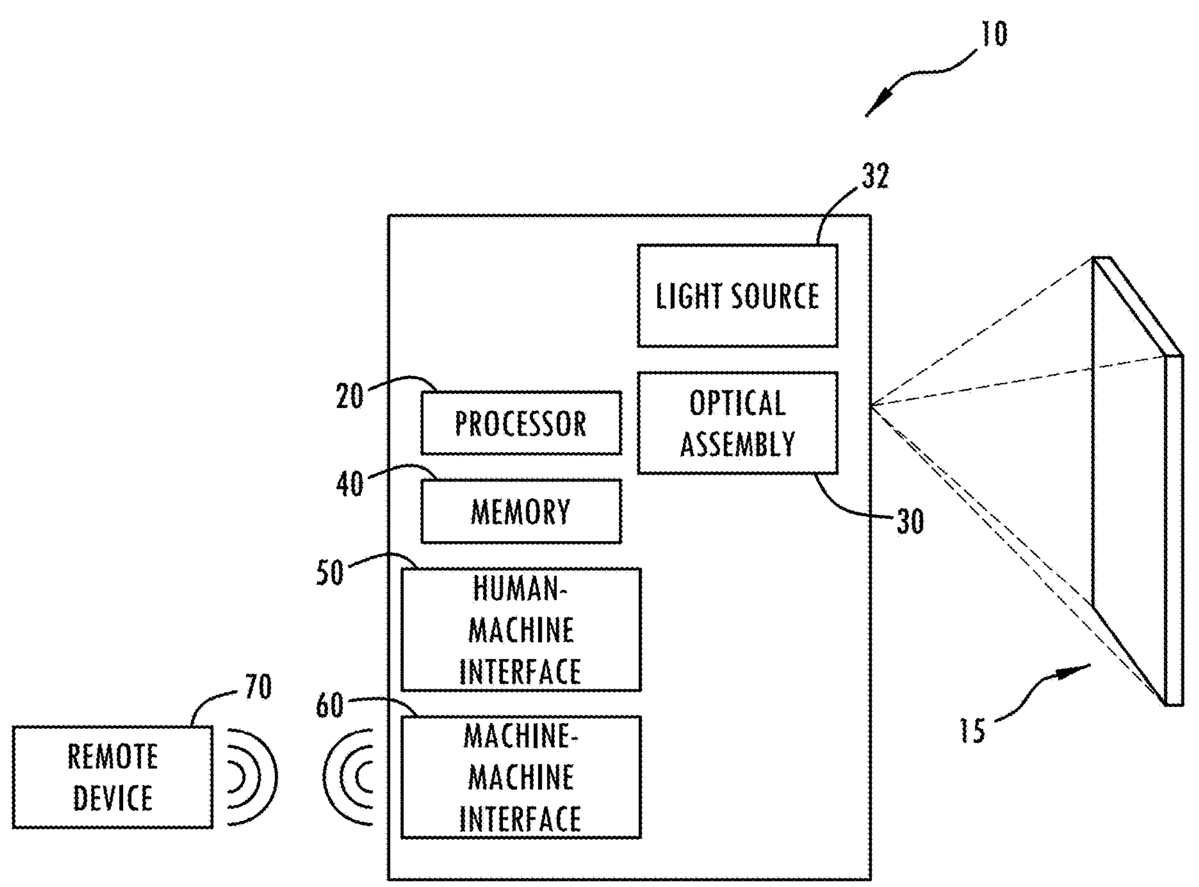
FIG. 1 is a schematic block diagram of a surface inspection system.

Referring to FIG. 1, a surface inspection system 10 is illustrated in a block diagram of an exemplary architecture for implementing the surface inspection system 10. The surface inspection system 10 may be implemented on a mobile computing device, such as a tablet computer, smartphone, or the like. The surface inspection system 10 may be implemented using known processing devices, such as a processor 20. The processor 20 may be or may include one or more microprocessors, digital signal processor, field programmable gate (or grid) array, microcontroller, or the like. The processor 20 is in electronic communication with an optical assembly 30. The optical assembly 30 may include one or more of a charge coupled device (CCD), complementary metal oxide semiconductor sensor (CMOS) or the like. The optical assembly 30, in cooperation with the processor 20, may be arranged to generate image data of a surface 15 based on the visible light spectrum, ultraviolet or infrared. The surface inspection system 10 may include a light source 32, such as a light emitting diode (LED) or other suitable lighting device complementary to the sensing spectrum of the optical assembly 30.

The surface inspection system 10 includes a memory device 40 in electronic communication with the processor 20. The memory device 40 may include one or more primary memory, such as random access memory (RAM), and one or more secondary memory. The secondary memory may include, for example, a hard disk drive, a solid state drive, a removable memory device, or optical disk drive, or the like. The memory device 40 may store instructions in the form of software that, when executed, cause the surface inspection system 10 to perform the operations as described in the below method 100 of inspecting a surface. The memory device 40 may also store information and data as a result of the operations performed.

The surface inspection system 10 includes a human-machine interface 50 in electronic communication with the processor 20. The human-machine interface 50 may include one or more display devices, such as a liquid crystal display (LCD) or other suitable display device. The human-machine interface 50 may include one or more input devices, that may be implemented as a keypad, a touchpad, a keyboard, pointing device, such as a mouse or trackpad, or the like. The human-machine interface 50 may further include a microphone for receiving audio input, such as for receiving voice commands. The human-machine interface 50 may include a speaker, tone generator, buzzer or other audio output device. Although illustrated with the human-machine interface 50 being integrated to the surface inspection system 10, the surface inspection system 10 may employ a wired or wireless connection to a remote input device or remote output device, such as an external display device, a wireless keyboard or a wireless speaker, for example, using a Bluetooth connection.

The surface inspection system 10 may include a machine-machine interface 60 in electronic communication with the processor 20. The machine-machine interface 60 may include one or more wired or wireless devices for transmitting data to or receiving data from other computing devices. For example, the surface inspection system 10 may include one or more of a WiFi adapter, a radio adapter, a cellular adapter, or other device for encoding and wirelessly exchanging data with a remote computing device 70. The remote computing device 70 may include a server, a data hub, or other computing device. There may be one or more intermediary devices (not shown) in communication between the surface inspection system 10 and the remote computing device 70, such as hubs, routers, gateways, relays, and the like. The surface inspection system 10 may include a Bluetooth radio, near-field communication (NFC) device, satellite communication device or other network interface controller.

Figure 2:
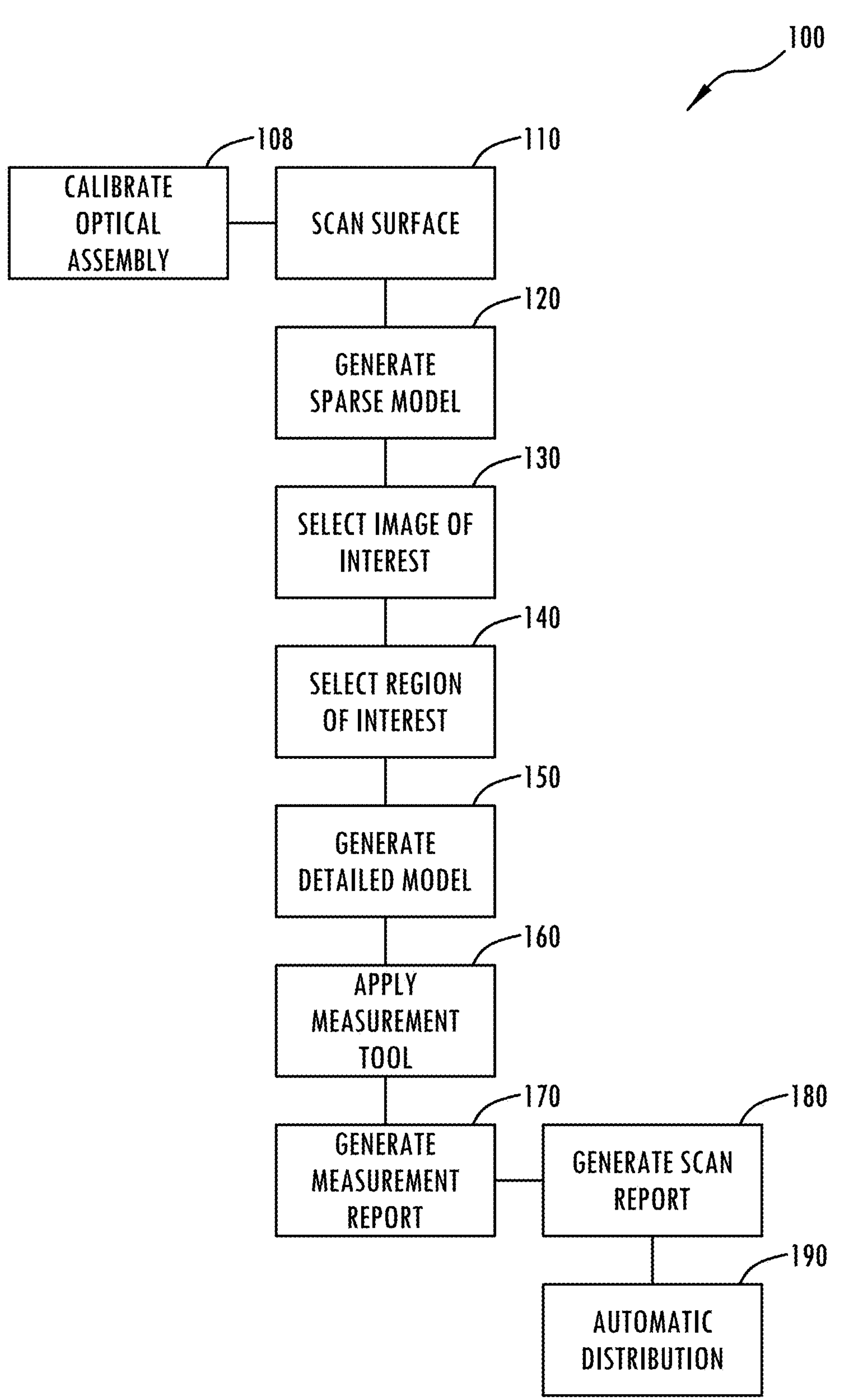
FIG. 2 is a flow chart illustrating the steps of a process for inspecting a surface with the surface inspection system of FIG. 1.

Referring now to FIG. 2, an exemplary process 100 for inspecting a surface and quantifying surface defects with the surface inspection system 10 is provided. Each of the operations is described in additional detail in the following discussion. Generally, the exemplary process 100 includes a first operation 110 of scanning the surface 15 with the optical assembly 30 of the surface inspection system 10 to generate image data representative of the scanned surface 15. Simultaneously with the scanning operation 110, the surface inspection system 10 performs a second operation 120 where the system 10 processes a downscaled version of the image data into a sparse 3D representation of the surface. The sparse 3D reconstruction is not displayed to the user, but is used as an error or data integrity check for the scanning process and may be used to generate user feedback as needed to improve the scan performance. Upon completion of the surface scanning operation 110, the system 10 stores in memory device 40 data comprising the series of images collected during the scanning operation 110 and the sparse model generated during operation 120 based on the image data.

In a third operation 130, one of the images is selected as an image of interest. Within the selected image of interest, a region of interest is selected in a fourth operation 140. The region of interest may comprise all or less than all of the image of interest. The surface inspection system 10 generates a detailed, high resolution 3D model of the selected region of interest in the next operation 150. The generation of the detailed, high resolution 3D model in operation 150 relies on the original full resolution image data from the scanning operation 110 that includes the surface features encompassed within the selected region of interest and excludes any image data that is beyond the bounds of the selected region of interest. The surface inspection system 10 applies measurement tools, in operation 160, to compute measurement information about the region of interest based on the detailed 3D model generated in operation 150. The surface inspection system 10 generates a measurement report at operation 170 to visualize the measurement information based on the on the detailed 3D model generated in operation 150 and the selected measurement tools applied in operation 160.

Optionally, the process 100 may include a preliminary operation 108 of calibrating the optical assembly 30 of the surface inspection system 10. The exemplary process 100 may also optionally include generating a scan report at operation 180, automatically distributing information associated with the process at operation 190, or both automatically generating and distributing informational report operations 180, 190.

Figure 3:
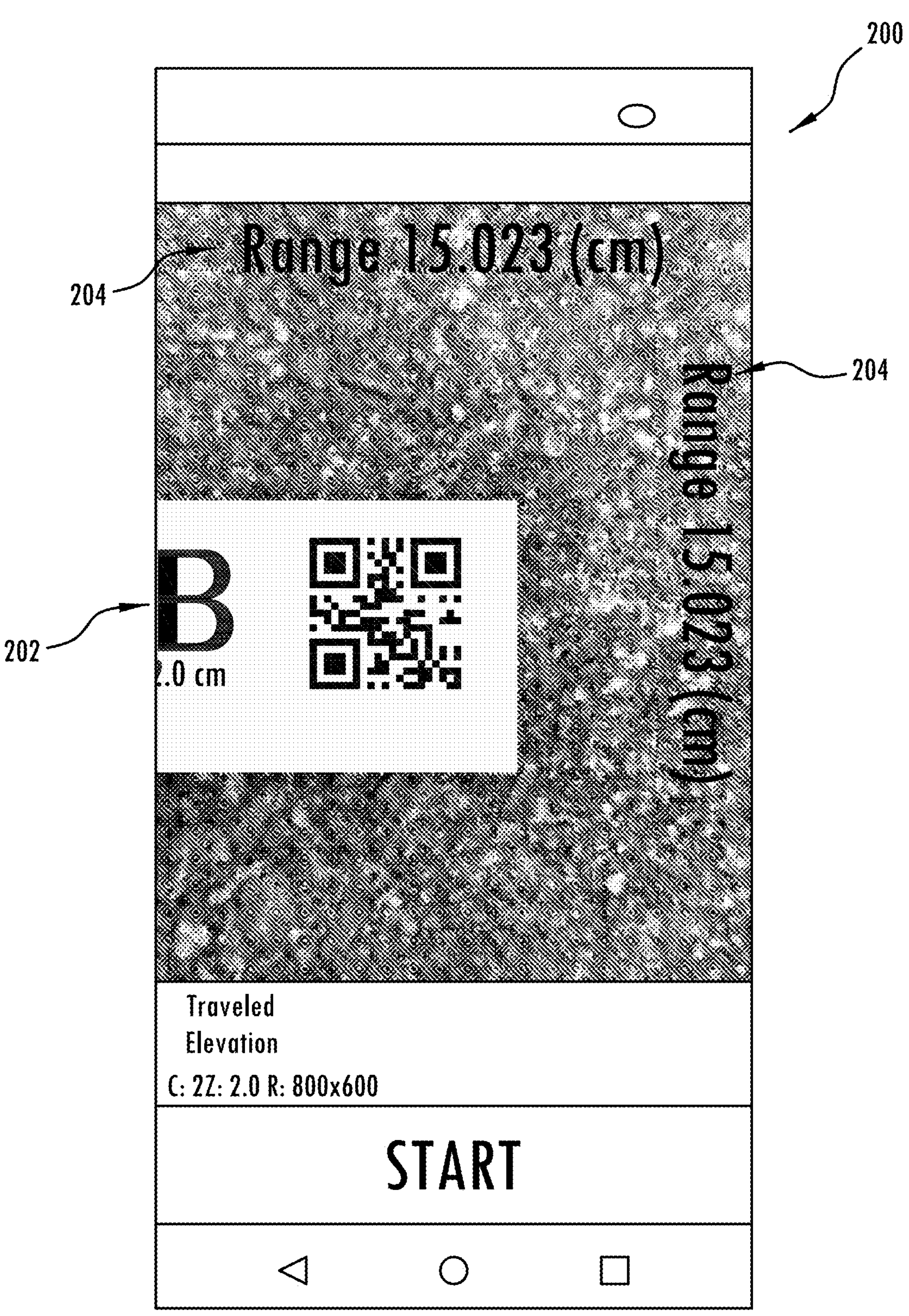
FIG. 3 is an exemplary graphical user interface displayed by the surface inspection system of FIG. 1 during the process illustrated in FIG. 2 in a calibration operation step.

Initial to executing the exemplary process 100, at operation 108, the optical assembly 30 may be calibrated to the surface inspection system 10, to the environment and to the surface being inspected. Illustrated in FIG. 3, an exemplary representation of a graphical user interface 200 displayed during a calibration operation 108 is shown. Calibration may be performed by disposing a quick response (QR) code 202, other two-dimensional matrix barcode, or other structured reference image in the field of view of the optical assembly 30. The surface inspection system 10 may analyze the image data including the reference image to determine an initial dimensional reference 204, such as by determining a relative distance from the optical assembly to the reference image based on its appearance in the image data. Other information may be determined during the calibration operation 108. For example, the surface inspection system 10 may include location information, such as via GPS to set initial location information for the scan. The location information may be updated in the course of the scanning operation based on changing GPS information, accelerometer, gyroscope, tilt sensor, or other sensor data indicating changing location. The location information may be sensed by the system 10, or may be supplied by the user and manually entered into the system.

Once calibrated, if the calibration operation 108 is performed, the surface inspection system 10 is used to scan the surface 15 of interest in the scanning operation 110. To scan the surface 15, the surface inspection system 10 may be translated across the surface 15 or otherwise moved with respect to the surface 15 with the optical assembly 30 facing toward the surface 15 at a suitable distance from the surface 15 depending on the nature of the optical assembly 30. In one example, using a conventional smartphone optical camera, a suitable distance may be between about 10 centimeters to about 45 centimeters. This is not intended to be limiting and other implementations of an optical assembly 30 may have a suitable distance smaller or greater, including, for example as close as 1 to 2 centimeters or as far as 5 or more meters. As the system 10 is moved relative to the surface 15, a series of images representing the surface 15 is collected. The series of images may be collected as a video recording, where the video recording is then segmented into discrete frames as a series of images.

Simultaneously with the scanning operation 110, the system 10 executes an operation 120 of transforming the image data, via the processor 20, to generate a sparse 3D reconstruction as a low resolution virtual model of the surface 15. The transformation of image data into a sparse 3D reconstruction follows a conventional monocular visual odometry operation. To generate the sparse 3D reconstruction, the system 10 may first downscale the image data from a native, high-resolution, image of the optical assembly to a low resolution image. Where the optical assembly 30 is a smartphone camera of more than 10 megapixels (MP), the sparse 3D reconstruction may be based on a downscaled image of less than 1 MP, or to about 0.5 MP, such as 480p having an array of 800×600 pixels, or an array of 640×480 pixels, or other suitable target resolution. Other suitable downscaling may be by a factor of 0.10, a factor of 0.05, a factor of 0.02, or other suitable factor. The sparse 3D reconstruction comprises one 3D data point for select pixels associated with a surface feature discerned from the image data. The surface feature detection may be based on, for example, Fast Hessian scale space blob detection, or Shi-Tomasi corner detection. Other suitable feature discriminator may be employed. Setting a minimum separation between detected features, which may depend on the resolution of the source images or other parameters, can decrease the overall processing load of transforming the image data into a sparse 3D reconstruction. In an alternative implementation, the system 10 may generate the sparse 3D reconstruction after the scanning operation 110 is completed. The system 10 may be arranged to generate the sparse 3D reconstruction with the processor 20 and without transmitting or receiving data from any external or remote device to perform the operation 130 of generating the sparse 3D reconstruction.

In one implementation, the sparse 3D reconstruction is generated as a 3D mesh rendered onto an imaged surface using a standard pinhole projection model. The mesh may be rendered using the coordinate system of the camera view from the selected image. For each pixel in the rendered image, the inverse depth 1/z is recorded, where z represents the depth and is the z-coordinate in the camera frame. A pixel in the rendered mesh is converted into 3D using the camera coordinate system based on known camera intrinsic parameters and the inverse depth of the pixel. The system 10 may be arranged to perform a data quality check on the sparse reconstruction by determining a best fit rigid body motion between images and determining any outlier data points having a projected residual error distance greater than a predefined threshold. Where the number of outlier data points exceeds a predefined threshold the operation 120 may fail and prompt the user to re-scan the surface 15.

The system 10 may generate and provide instructions and/or feedback to the user during the scanning operation 110. The instructions and/or feedback may be visual information displayed on the display device of the human-machine interface 50. The instructions may direct a translation or movement of the system 10 relative to the surface 15, a direction to change distance between the system 10 and the surface 15, a direction to rotate the system 10 relative to the surface 15, or combinations thereof. In addition, or in the alternative, the instructions and/or feedback may be audible information, such as pre-recorded verbal instructions, beeps, tones, or the like. The instructions and/or feedback may be haptic or tactile sensations generated, for example, as vibrations or pulses.

Figure 4:
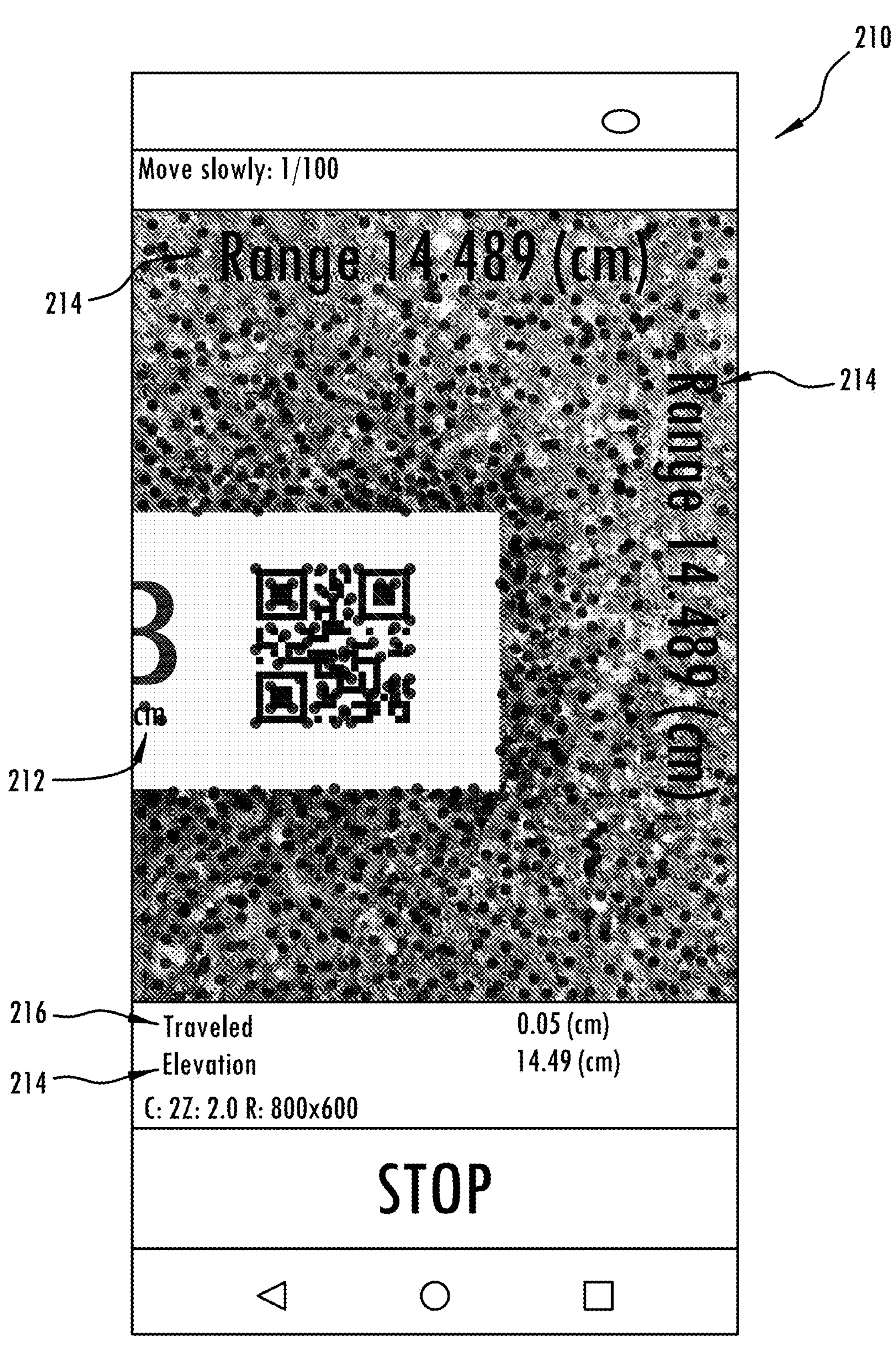
FIG. 4 is an exemplary graphical user interface displayed by the surface inspection system of FIG. 1 during the process illustrated in FIG. 2 in a scanning operation step.

The system 10 may provide live or real-time feedback during the scan operation 110 to represent the quality of the scan output and/or indicate the completeness of the scan. Illustrated in FIG. 4, an exemplary representation of a graphical user interface 210 displayed during a scan operation 110 is shown. As additional image information is generated of a portion of the surface, the system 10 may generate a display 210 of the imaged surface 15 with an overlay of color-coded dots 212, such as red, yellow and green to indicate that a new portion of the surface has been recognized in the image data (red), additional imaging of the portion has been recorded (yellow) and when sufficient imaging has been collected to generate a detailed 3D model (green). Sufficient imaging may be achieved when the system is able to calculate the depth parameter of the surface 15. The relative distance or range between the system 10 and the surface 15 may be displayed as a continuously updating value 214 to assist the user in maintaining a consistent separation. The range 214 may be selectively provided along respective edges to accommodate the use of the system 10 in a portrait orientation or a landscape orientation. The system 10 may also provide an indication 216 of how far the system 10 has translated across the surface 15 during the scanning operation 110.

Figure 5:
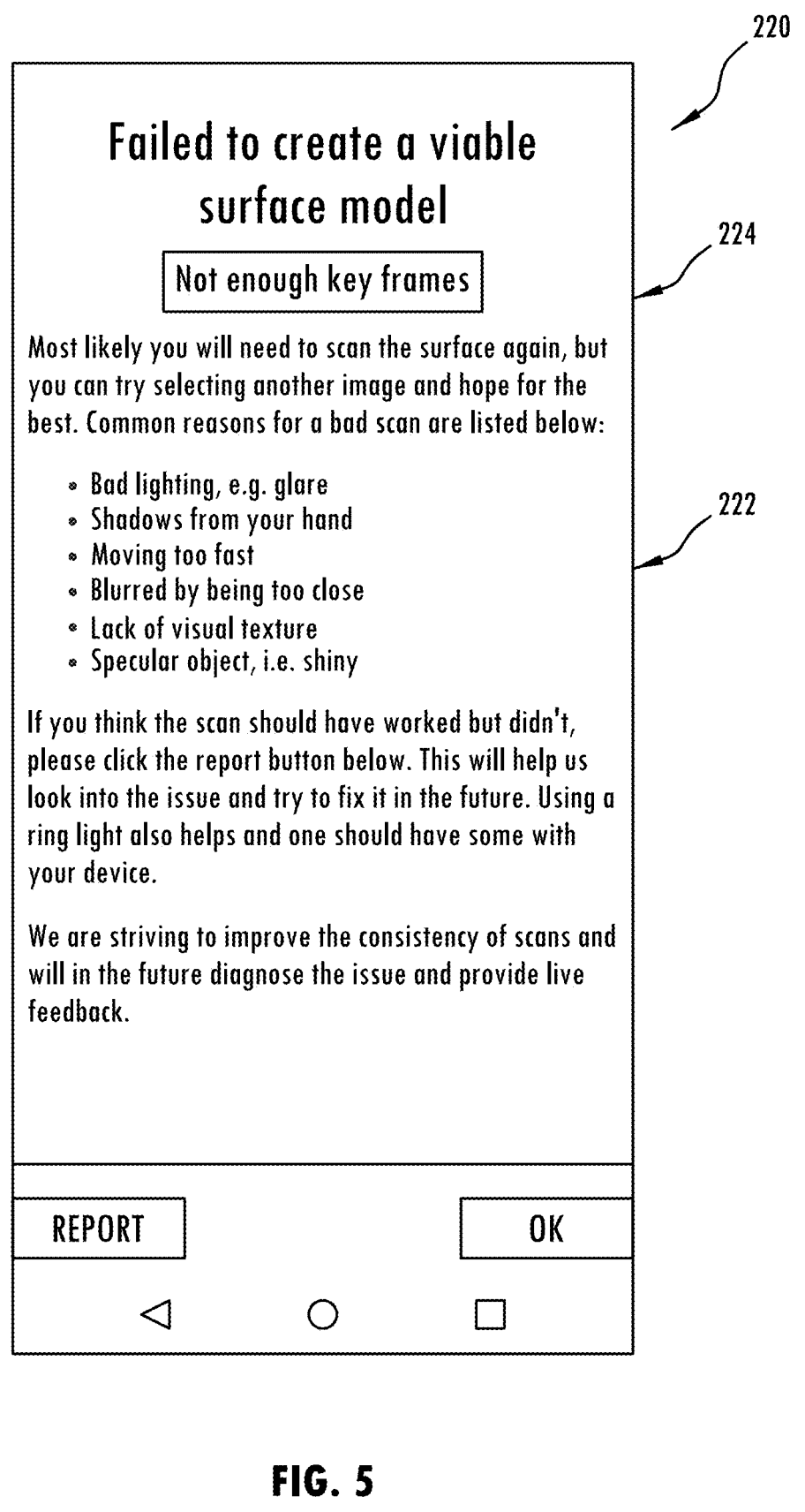

The scanning operation feedback may also indicate a quality of the information gathered during the scanning operation 110. For example, scanning a surface using a typical camera implemented in a smart phone, may be negatively impacted in high brightness, such as direct sun light on a specular or shiny surface. The presence of shadows or glare may also negatively impact the scan quality. Error detection may be performed concurrently with the scanning operation 110 to detect outliers in the surface information. Scan errors may indicate surface information at infinity or as not a number (NaN), indicating a low quality scan. The system 10 may provide feedback by displaying a region of the surface with an indication of poor scan quality. Illustrated in FIG. 5, an exemplary representation of a graphical user interface 220 displayed during a scanning operation 110 that has failed to complete successfully. The error message may be a generic indication 222 of common parameters that separate successful scan operations from unsuccessful operations. Alternatively or in addition, the system 10 may determine a cause of the scan failure and indicate a specific failure cause 224.

The system 10 may determine that sufficient image data has been collected based on a predefined threshold number of images in which the region appears, surface area covered, detects a specially encoded marker, the amount of time a region appears within the image data, loss of feature tracks, or other suitable control definition associated with monocular visual odometry. Once a sufficient scope of the target area has been scanned based on the desired inspection, and the sparse 3D reconstruction has rendered without errors or failures to establish confidence in the quality of the surface scan, the scanning operation 110 may be terminated.

The surface inspection system 10 may display, on the display device of the human-machine interface 50, one or more key images from the series of collected images from the scanning operation 110 for the user to manually select an image of interest of the surface. In an alternative implementation, the image of interest may be selected automatically according to certain predetermined rules, at image selection operation 130. The user may select an image by providing input through the human-machine interface 50. The selected image may include a particular feature of interest, and appears in the selected image in focus and with adequate illumination. In an alternative implementation, the system 10 may be provided with rules for automatically selecting an image based on certain color or shape patterns, location distributions, or other predefined parameters. For example, the system 10 may be provided with a known location of a prior scan operation and an image may be automatically selected based on the surface scan operation 110 encompassing the same location as the prior scan.

Figure 6:
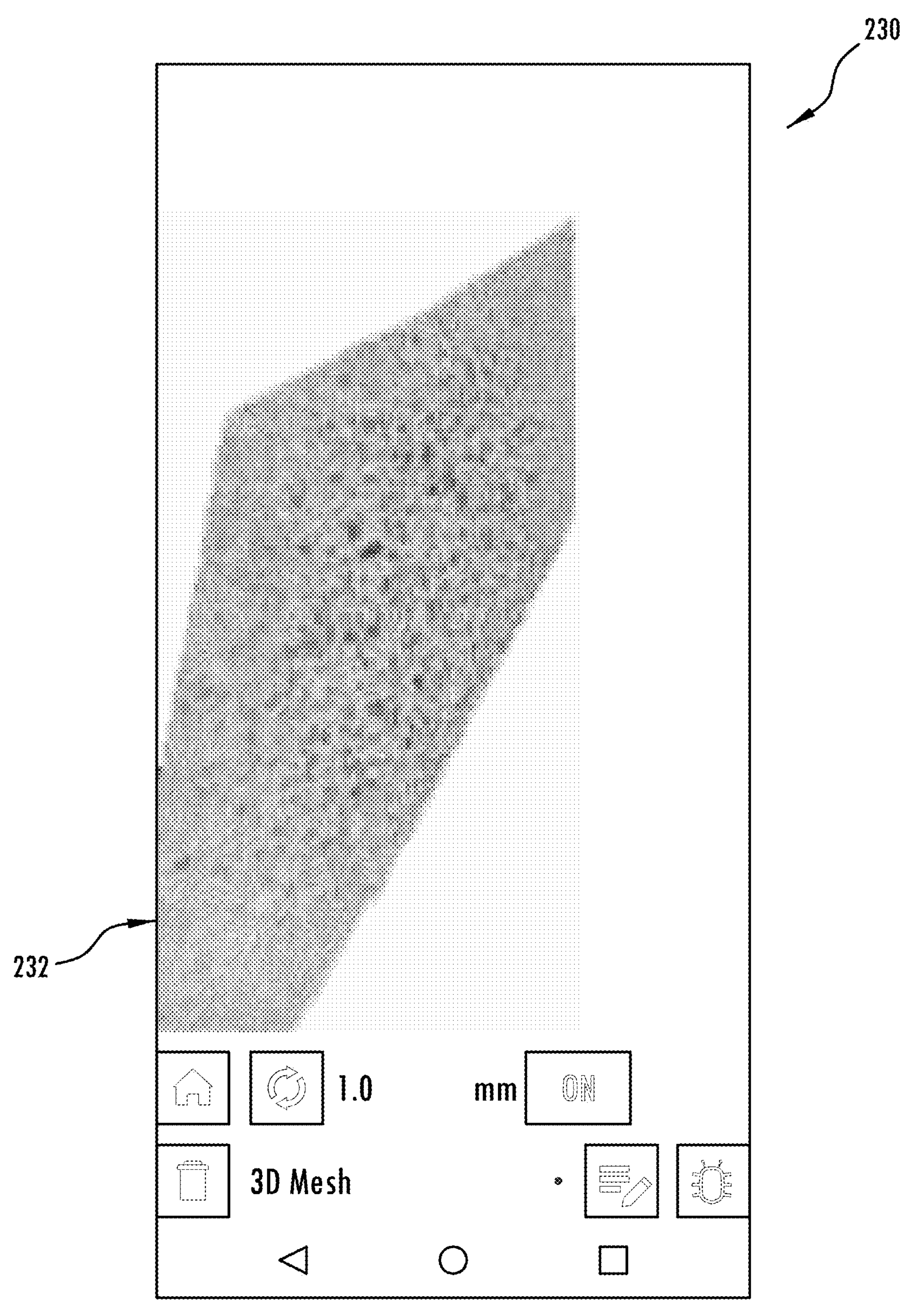
FIG. 6 is an exemplary graphical user interface displayed by the surface inspection system of FIG. 1 during the process illustrated in FIG. 2 showing a surface mesh visualization.
Figure 7:
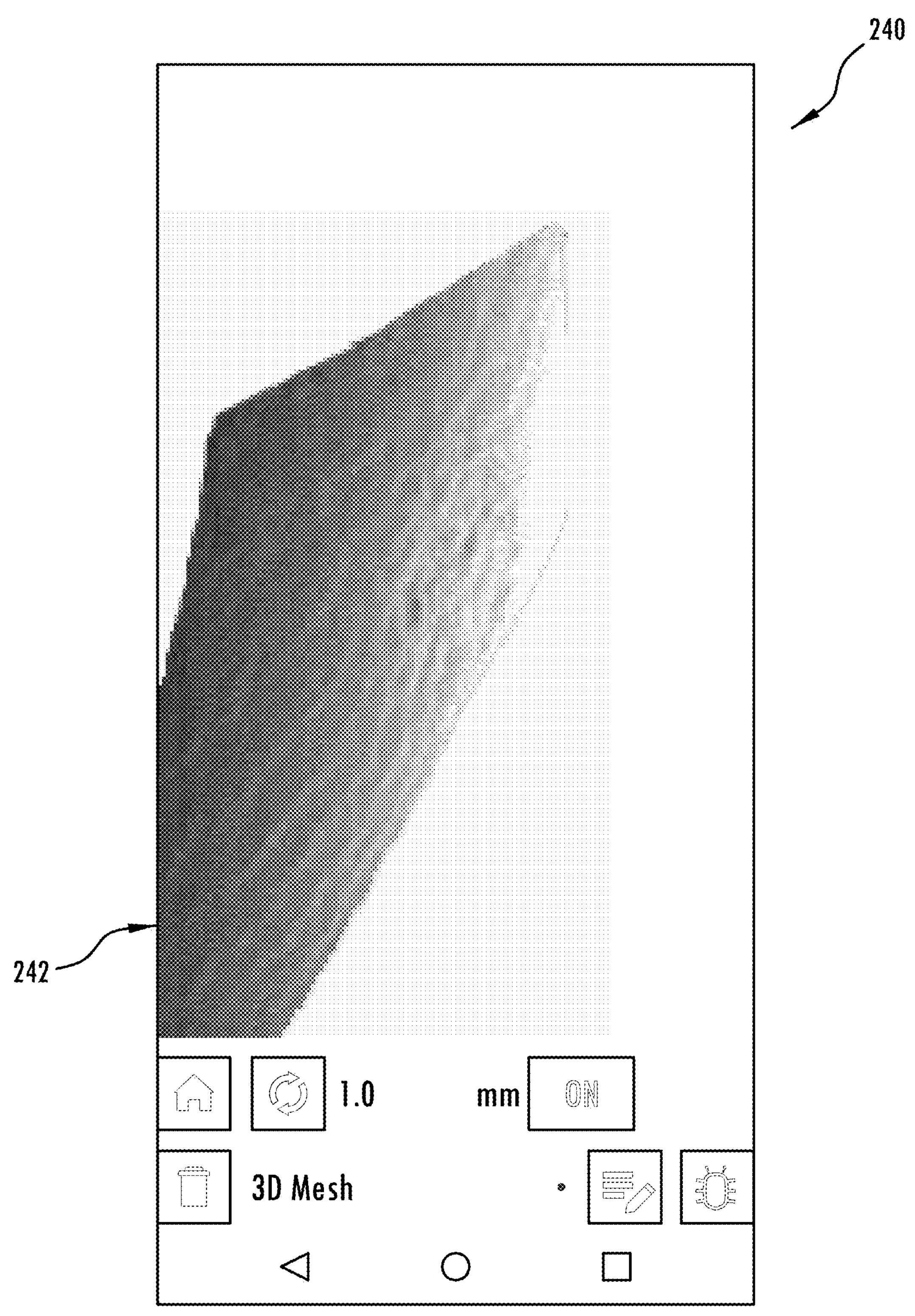
FIG. 7 is an exemplary graphical user interface displayed by the surface inspection system of FIG. 1 during the process illustrated in FIG. 2 showing a smoothed surface visualization.
Figure 8:
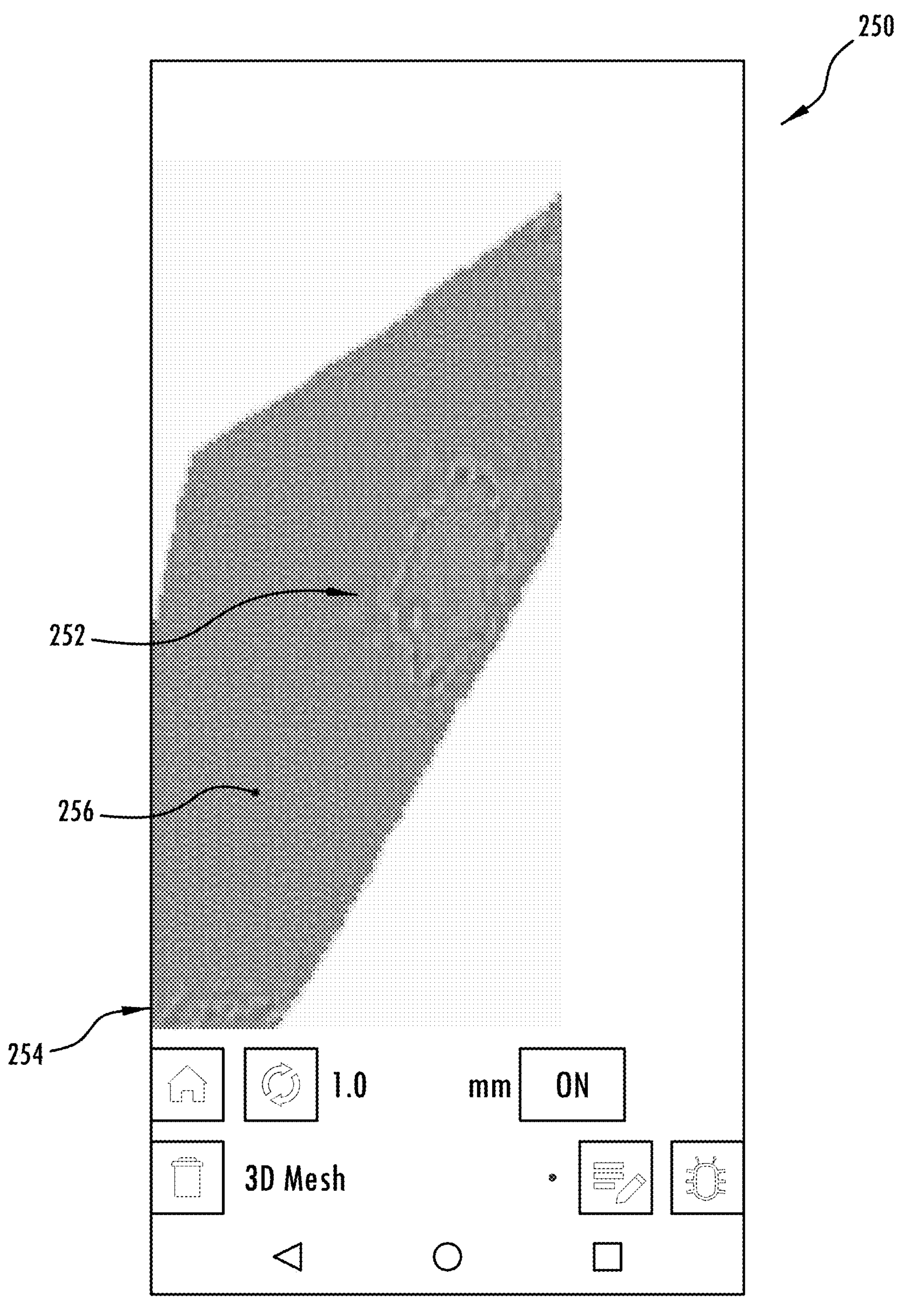
FIG. 8 is an exemplary graphical user interface displayed by the surface inspection system of FIG. 1 during the process illustrated in FIG. 2 showing a surface tolerance visualization.

Illustrated in FIGS. 6-8, are exemplary representations of a graphical user interface 230, 240, 250 showing renderings of a 3D reconstruction in different visualization modes. In FIG. 6, the system 10 shows a colorized mesh 232 overlaid or superimposed on an image of the surface 15. The graphical user interface 230 may display other information, such as a dimensional scale and allow the user to manipulate the 3D reconstruction scale and perspective. In FIG. 7, the system 10 shows a surface model 242 to detail features of the imaged surface profile. In FIG. 8, the system 10 highlights regions 252, 254 of the 3D reconstruction that are outside of a tolerance above or below a primary plane 256. The primary plane 256 may be defined by a best fit plane to minimize errors and ignoring outliers. In one implementation, points out of tolerance above the plane may be shown in a first color and points out of tolerance below the plane may be shown in a second color. The threshold may be user defined or may be predefined, for example, based on the type of subject surface 15.

In operation 140, a region of interest is selected. The region of interest may be selected within the selected image of interest of operation 130. The region selection 140 may be performed manually by a user, or may be performed automatically by the system 10 according to predefined rules defined and stored in the memory 40. Where the region selection 140 is performed manually, the system 10 may display on the display device of the human-machine interface 50 the image of interest selected in the image selection operation 130.

The user may provide a selection input to define a region of interest in operation 140 via the human-machine interface 50. In one implementation, the user may use a touchscreen interface to touch a portion corresponding to a feature in the selected image of interest. Alternatively, the user may select a point of interest, and the system 10 may define the region of interest based on the point selection input plus a predefined margin around the point input location. The system 10 may prompt and allow the user to select from among multiple alternative margin sizes to define a small, medium, or large region of interest, or other suitable size. In an alternative implementation, the user may touch-and-drag, or click-and-drag for a pointer input, to bound a region of the selected image or the sparse 3D reconstruction to define the region of interest. The system 10 may prompt the user and allow the user to select a round, oval, or rectangular geometry, or other suitable shape, for the region of interest. In one implementation, the user may manually adjust individual edges of the region of interest.

Based on the region of interest selected in operation 140, the system 10 generates, via the processor 20, a dense 3D reconstruction as a virtual model of the surface 15 in the area of the region of interest alone in operation 150. The generation of the dense 3D reconstruction may apply the same or different photogrammetry methods as generating the sparse 3D reconstruction. To generate the dense 3D reconstruction, the system 10 transforms image data gathered during the scanning operation 110 and used for the sparse 3D reconstruction, as limited and bounded by the selected region of interest. The entirety of the image data comprising the series of images collected during the scanning operation 110 may be defined as a first image data set. The image data used to generate the dense 3D reconstruction may be defined as a second image data set, which is a subset of the first image data set. Rather than assigning 3D data to each feature detected in the image data as in the sparse 3D reconstruction, each pixel in the key fames, defined as those images that include the region of interest, is assigned a 3D location data point in the dense 3D reconstruction. More specifically, images that do not include the region of interest are ignored for the dense 3D reconstruction operation. Additionally, in images that include more than the selected region of interest, only those portions that include the region of interest are transformed into the 3D data points contributing to the dense 3D reconstruction. Where the sparse 3D reconstruction comprises relatively few data points, the dense 3D reconstruction comprises far more data points to provide a high resolution, high detail 3D reconstruction. The dense 3D reconstruction may comprise between 3 and 5, or more, orders of magnitude more data points than the sparse 3D reconstruction. The system 10 may be arranged to generate the dense 3D reconstruction with the processor 20 and without transmitting or receiving data from any external or remote device to perform the operation 150 generating the dense 3D reconstruction. The system 10 may selectively display the dense 3D reconstruction in a colorized mesh view overlaid or superimposed on an image of the surface 15, a surface model, or an out-of-tolerance view, as illustrated in FIGS. 6-8.

The dense 3D reconstruction provides a high resolution reproduction of the region of interest of the surface 15 that can by analyzed and provide useful measurement data with the application of virtual measurement tools by the processor in operation 160. The system 10 may prompt the user to select a feature within the region of interest on which to apply one or more measurement tools. The system 10 may display the selected image, projected 3D mesh, the sparse 3D reconstruction or dense 3D reconstruction on the display device of the human-machine interface 50 and prompt the user to select a feature for measurement. In an alternative implementation, the system 10 may be configured to automatically apply the measurement tool to surface features in the region of interest based on predefined rules of image analysis to detect defects or areas of concern. The measurement tools may provide a numerical analysis of aspects of the region of interest based on the dense 3D reconstruction. The measurement tools may be arranged to determine a point of maximum distance, above or below, within a discrete portion of the model, based on a user-selected area of the model on which the measurement tool is applied. The measurement tools may generate a silhouette or profile to graphically illustrate, in a plot or other graphical representation, the relative distance of different points along a portion of the surface within the region of interest.

In one example implementation, the measurement tool includes a region selection tool. The system 10 may prompt the user to designate a region using the touchscreen display, within the rendered surface previously defined by the selected region of interest. The signed distance of all points inside the area defined by the region selection tool is found. The signed distance is defined as the distance of the point in three dimensions from the region in 3D space and may be referred to as the height or z-value in the 3D co-ordinate system. A point will have a negative sign if it is a greater distance from the origin than the closest point on the region's surface. A maximum distant point 264, 268 is found within this region and automatically displayed. Possible regions include line, rotated rectangle, and ellipse. A plot summarizing the signed distances of points inside the region is shown below 268, 294 the visual presentation of the selected region of interest.

Figure 9:
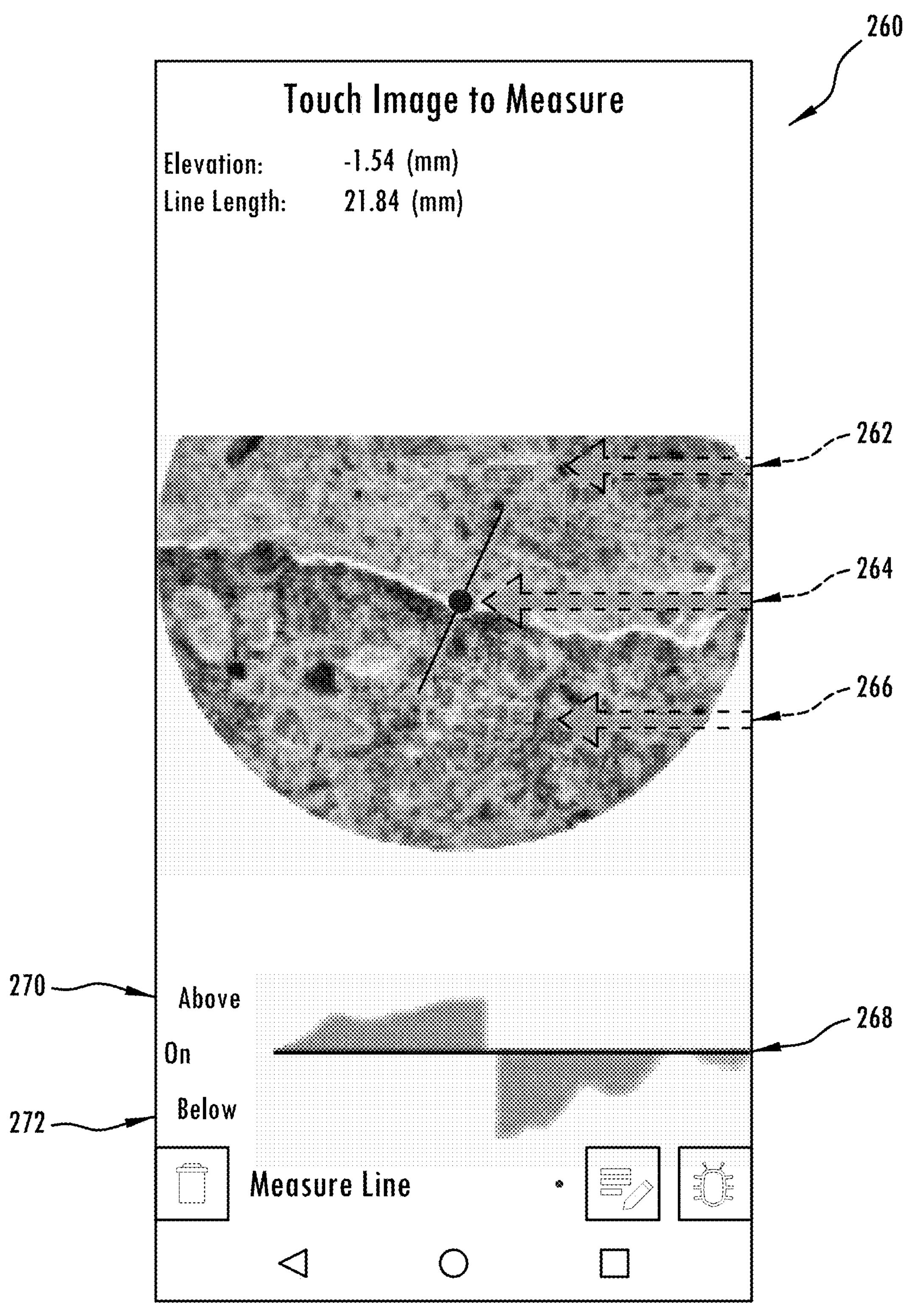
FIG. 9 is an exemplary graphical user interface displayed by the surface inspection system of FIG. 1 during the process illustrated in FIG. 2 applying a line measuring tool to a virtual surface visualization.

A graphical user interface 260, illustrated in FIG. 9, shows an exemplary implementation of a line tool applied to the dense 3D reconstruction, visualized with an image of the surface 15. A line segment can be defined by having the user touch and drag inside the rendered surface. The first and last points touched would define the end points of the line and the known 3D coordinates of the end points in the rendered mesh will define the straight line in the virtual 3D environment. In one implementation, the system 10 may be arranged to allow the user to sweep the line, once created, within the region of interest to analyze local surface features, such as dips and bumps. In this meaning, to sweep the line means to translate the endpoints of the line simultaneously in a direction perpendicular to the selected line segment. Information displayed with the line tool may indicate on the display of the human-machine interface 50 a line length 262, an indication of the maximal distant point 264, and an elevation 266 of the maximal distant point as the signed distance away from the z-value or height of the line extending between the selected end points. In addition, or in the alternative, a plot 268 illustrates the elevation of points along the line segment indicating a relative z-value or height value for the points along the selected line as a signed, normal distance from the line. The plot 268 may be illustrated using separate colors to differentiate points above the z-value of the line segment and below the z-value of the line segment. The plot 268 may also indicate a magnitude 270 of the point along the line having the maximum distance above the line and a magnitude 272 of the point along the line having the maximum distance below the line.

In an alternative implementation, the measurement tool may prompt the user to select a two-dimensional area, such as a rectangular area, an elliptical area, or other closed shape as a measurement area within the region of interest. The system 10 may prompt the user to define the measurement area, for example, by touch-and-drag on a touch screen display, within the region of interest. A 2D ellipse or rotated rectangle can be defined by touch-and-dragging the screen to define the first axis, with the user control points to adjust the other axis. The boundary of the measurement area is defined by the center point, axis lengths and rotation. To define this region in 3D, 1) a plane is fit robustly so that it ignores outliers to all the points which lie below the shape's perimeter in the image, 2) then clip the plane so that the only remaining points are projected inside the user-selected region inside the image. In one implementation, the two-dimensional measurement area is defined by a plane bounded by the selected region and set at a z-value or height within the virtual 3D space that is a best fit plane of at least 80% of the z-values or heights of the 3D location of the points making up the boundary perimeter. The area tool then generates a measurement of the normal distance of each of the points within the measurement area to the best fit plane. The area measurement tool may also determine a point of maximum distance above the best fit plane, and a point of maximum distance below the best fit plane within the measurement area. In one implementation, the system 10 may be arranged to allow the user to sweep the measurement area, once created, within the region of interest to analyze local surface features.

Figure 10:
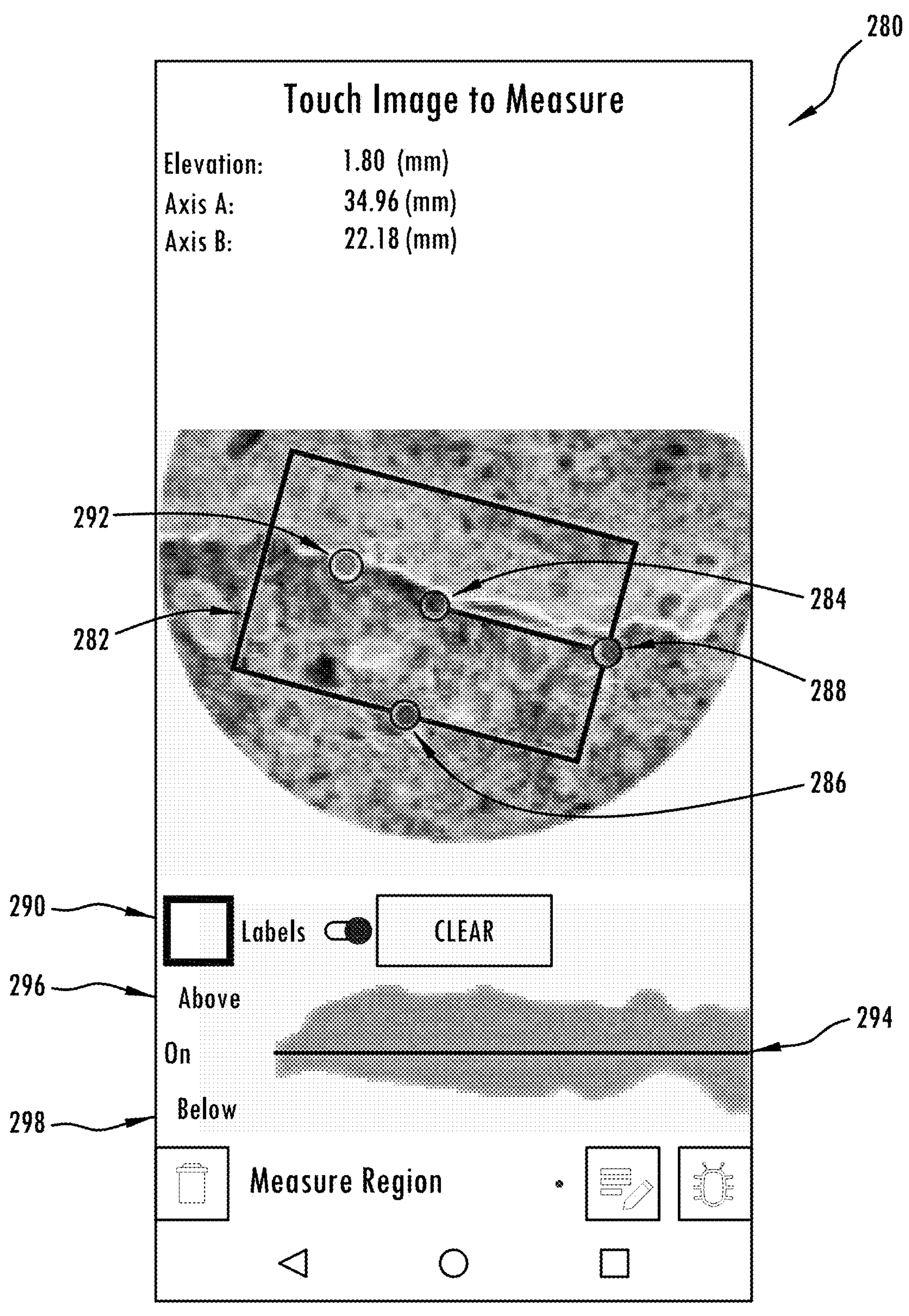
FIG. 10 is an exemplary graphical user interface displayed by the surface inspection system of FIG. 1 during the process illustrated in FIG. 2 applying a rectangular measuring tool to a virtual surface visualization.

A graphical user interface 280, illustrated in FIG. 10, shows an exemplary implementation of a rectangular area tool applied to the dense 3D reconstruction, visualized within an image of the surface 15. Information displayed with the rectangular area tool may indicate on the display of the human-machine interface 60 a rectangular area boundary 282, a center point 284, a first axis length 286, and a second axis length 288. Information displayed with the measurement area may indicate the selected shape of the measurement area 290, in this case a rectangle, and a designation 292 of the maximal distant point with the signed distance away from the best fit plane. In addition, or in the alternative, a plot 294 illustrates the minimum and max elevation of points within the measurement area as a function of the location along the first axis 286. The plot 294 may also indicate the distance magnitude 296 of the point within the measurement area having the maximum distance above the best fit plane and a distance magnitude 298 of the point having the maximum distance below the best fit plane. The plot 294 may be illustrated using separate colors to differentiate points above and below the best fit plane.

Figure 11:
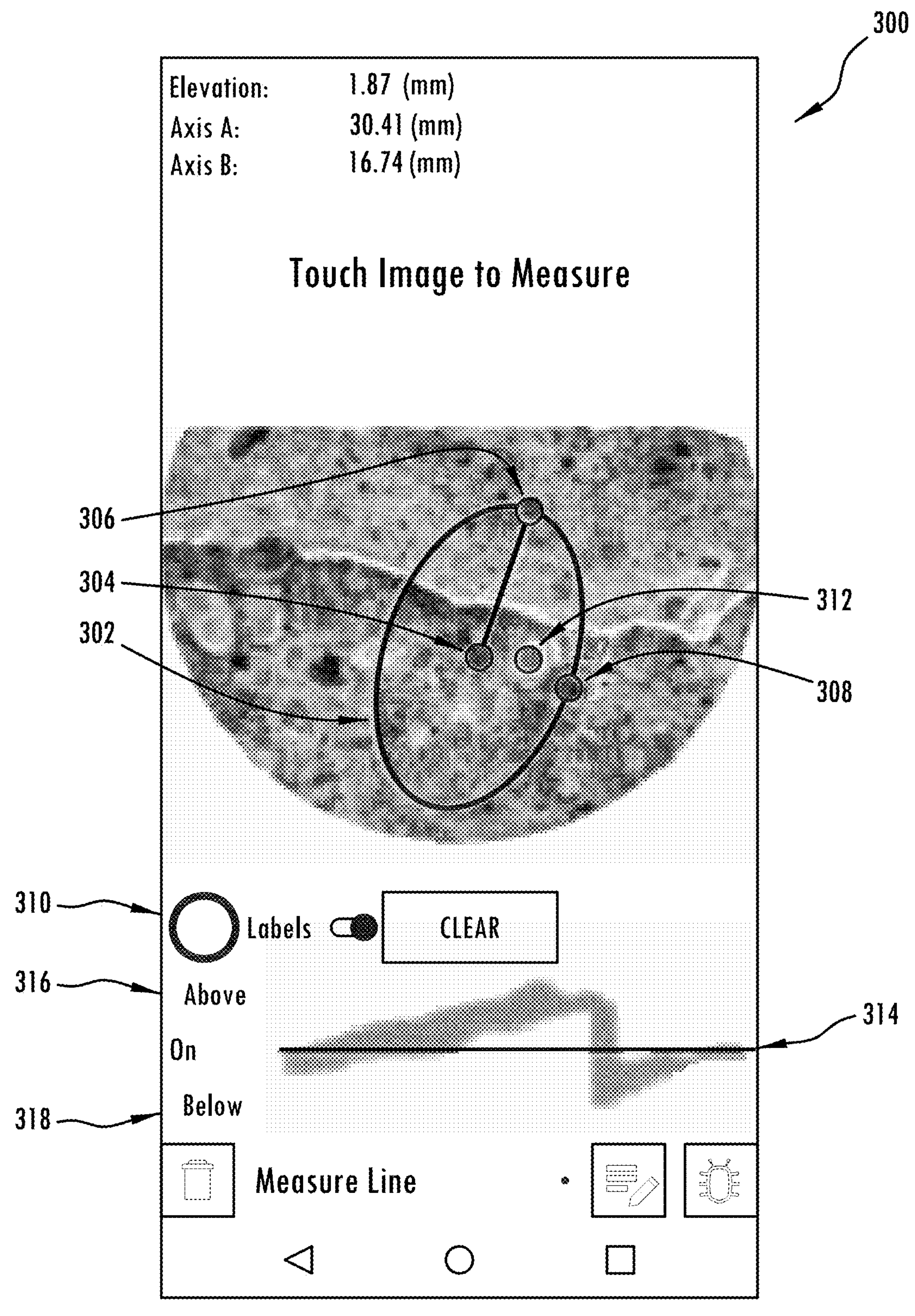
FIG. 11 is an exemplary graphical user interface displayed by the surface inspection system of FIG. 1 during the process illustrated in FIG. 2 applying an ellipsoidal measuring tool to a virtual surface visualization.

A graphical user interface 300, illustrated in FIG. 11, shows an exemplary implementation of an oval area tool applied to the dense 3D reconstruction, visualized within an image of the surface 15. Information displayed with the oval area tool may indicate on the display of the human-machine interface 50 an oval area boundary 302, a center point 304, a first axis length 306, and a second axis length 308. Information displayed with the measurement area may indicate the selected shape of the measurement area 310, in this case an oval, and a designation 312 of the maximal distant point with the signed distance away from the best fit plane. In addition, or in the alternative, a plot 314 illustrates the minimum and max elevation of points within the measurement area as a function of the location along the first axis 306. The plot 314 may also indicate the magnitude 316 of the point within the measurement area having the maximum distance above the best fit plane and a magnitude 318 of the point having the maximum distance below the best fit plane. The plot 314 may be illustrated using separate colors to differentiate points above and below the best fit plane.

Once the measurements have been performed, the measurement data is collected into a measurement report that associates measurement data with scan data, such as location data, or other user-provided information, at operation 170. The measurement report 170 may also include flags or signals to indicate when a measurement result is present in the measurement report 170 beyond a predetermined threshold. The system 10 may also be configured to generate a scan report at operation 180 that associates the measurement report with one or more of the images collected during the scan operation 110, the sparse 3D reconstruction 130, the dense 3D reconstruction 150, or combinations thereof. The user may selectively designate portions of the analysis, or particular orientations or perspectives of the sparse or dense 3D reconstructions for inclusion in the scan report 180 by taking a screenshot that associates any displayed information or images with the respective data and values underlying the operations resulting in the displayed information. The system 10 may allow the user to annotate or flag aspects of the images, the 3D reconstructions, or the measurement data. The system 10 may allow the user to create or assign predefined tags to the scan results, including, one or more of corrosion, metallic, cement, erosion, ceramic, pie, storage tanks, refractory, structure, or the like. The system 10 may provide predefined categories or tags to classify the inspection results of a scan operation as one or more of good, interesting, concerning, bad, or the like. The system 10 may be further configured to automatically distribute one or more of the measurement report 170, the scan report 180, or combinations thereof, to a remote device, such as a server or network resource, via the machine-machine interface 60.

For purposes of this disclosure, the term "coupled" (in all of its forms, couple, coupling, coupled, etc.), and similar terms, generally mean the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated. Similarly, the terms "supported," "joined," "mounted," in all their forms, should be understood similarly to include directly or indirectly, permanently or impermanently, rigidly or resiliently, unless stated otherwise.

The articles "a," "an," and "the" are intended to mean that there are one or more of the elements in the preceding descriptions. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional implementations that also incorporate the recited features. Furthermore, the terms "first," "second," and the like, as used herein do not denote any order, quantity, or importance, but rather are used to denote element from another.

Numbers, percentages, ratios, or other values stated herein are intended to include that value, and also other values that are "about" or "approximately" the stated value, as would be appreciated by one of ordinary skill in the art encompassed by implementations of the present disclosure. A stated value should therefore be interpreted broadly enough to encompass values that are at least close enough to the stated value to perform a desired function or achieve a desired result. For example, the terms "approximately," "about," and "substantially" may refer to an amount that is within less than 5% of, within less than 1% of, within less than 0.1% of, and within less than 0.01% of a stated amount.

Further, it should be understood that any directions or reference frames in the preceding description are merely relative directions or movements. For example, the terms "upper," "lower," "right," "left," "rear," "front," "vertical," "horizontal," and derivatives thereof shall relate to the orientation shown in FIG. 1. However, it is to be understood that various alternative orientations may be provided, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

Changes and modifications in the specifically described embodiments may be carried out without departing from the principles of the present invention, which is intended to be limited only by the scope of the appended claims as interpreted according to the principles of patent law. The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A system for inspecting a surface, the system comprising:

a mobile computing device comprising:

a processor;

an optical assembly in electronic communication with the processor;

a human-machine interface in communication with the processor, the human-machine interface comprising a display device and an input device; and a memory device in electronic communication with the processor, the memory device storing instructions that when executed cause the mobile computing device to execute operations of:

generating, via an optical assembly, a series of images representing the surface, the series of images defining a first image data set;

generating, via the processor, a sparse 3D reconstruction of the surface based on a recognition of sparse features within the first image data set;

after generating the sparse 3D reconstruction, receiving, via the input device, a selection of a region of interest of the surface that includes a surface feature;

defining, with the processor, a second image data set, the second image data set being a subset of the first image data set and having the selected region of interest;

after receiving the selection of the region of interests, generating, with the processor, a dense 3D reconstruction of the region of interest and that includes the surface feature, the dense 3D reconstruction based on the second image data set;

generating, on the display device, a rendering of the dense 3D reconstruction; and determining, with the processor a measurement data within the region of interest, wherein the region of interest of the surface includes the surface feature, and wherein the measurement data includes an elevation of the surface feature.

2. The system of claim 1, wherein the memory device further comprises instructions that when executed cause the mobile device to execute an operation of receiving, via the input device, a selection of a measurement area of the dense 3D reconstruction, and wherein the measurement data is associated with the measurement area.

3. The system of claim 2, further comprising generating and displaying a plot, wherein the plot illustrates the minimum or a maximum within the measurement region.

4. The system of claim 1, wherein generating the series of images comprises recording a video.

5. The system of claim 1, wherein generating the series of images comprises generating, on the display device, instructions to move the mobile computing device relative to the surface.

6. The system of claim 5, wherein the instructions comprise one of a translation direction, a distance direction, a rotation direction, or combinations thereof.

7. The system of claim 1, wherein generating the series of images comprises generating, on the display device, live feedback representing a scan quality negatively impacted by high ambient brightness, the surface being shiny, or both.

8. The system of claim 1, wherein the sparse 3D reconstruction comprises a virtual 3D model of between 300 and 1000 data points; and wherein the high resolution 3D reconstruction comprises a 3D model of more than 0.5 million data points.

9. The system of claim 1, wherein generating the sparse 3D reconstruction comprises performing a data quality check, wherein the data quality check determines an outlier data point having a distance greater than a predefined threshold from a plurality of adjacent data points.

10. The system of claim 1, wherein the mobile computing device further comprises a wireless data communication device.

11. The system of claim 10, wherein the memory device further comprises instructions that when executed cause the mobile device to execute an operation of transmitting, via a wireless communication device, data comprising one or more of the series of images, the region of interest, the high resolution 3D reconstructions, the measurement, and combinations thereof.

12. The system of claim 1, wherein the instructions, when executed, cause the mobile computing device to additionally execute an operation of scanning, via an optical assembly, the surface from a distance of 45 centimeters or less from the surface; and wherein the series of images are based on visible light.

13. The system of claim 1, wherein the elevation of the surface feature is a distance measured relative to a geometric shape defined by the surface surrounding the surface feature.

14. The system of claim 13, wherein the geometric shape is one of a line or a plane, the line extending between two points on the surface surrounding the surface feature and the plane being fit to the surface surrounding the surface feature.

15. The system of claim 13, wherein the elevation is measured in the z-axis of a three-dimensional coordinate system of which x- and y-axes correspond to a frame of the images.

* * * * *